US008224388B2

(12) United States Patent
Kim et al.

(10) Patent No.: US 8,224,388 B2
(45) Date of Patent: Jul. 17, 2012

(54) MOBILE COMMUNICATION TERMINAL DISPLAYING BACKGROUND SCREEN AND DISPLAY METHOD THEREOF

(75) Inventors: Keun Young Kim, Seoul (KR); Byeong Cheol Hwang, Seoul (KR); Jin Young Jeon, Seoul (KR); Yu Ran Kim, Seoul (KR); Min Young Chang, Seongbuk-gu (KR)

(73) Assignee: Samsung Electronics Co., Ltd (KR)

( * ) Notice: Subject to any disclaimer, the term of this patent is extended or adjusted under 35 U.S.C. 154(b) by 733 days.

(21) Appl. No.: 11/796,449

(22) Filed: Apr. 27, 2007

(65) Prior Publication Data

US 2007/0275766 A1    Nov. 29, 2007

(30) Foreign Application Priority Data

May 25, 2006 (KR) .................. 10-2006-0046833

(51) Int. Cl.
H04B 1/38 (2006.01)
(52) U.S. Cl. ............... 455/566; 455/556.2; 379/201.4; 379/140
(58) Field of Classification Search .............. 455/88, 455/352, 56.1, 556.2, 557, 566, 569.1, 550.1, 455/418–420, 551; 379/93.17, 93.23, 111, 379/112.01, 112.06, 112.07, 112.08, 122, 379/133, 136, 137, 139, 140, 201.01, 201.04, 379/428.03, 433.04
See application file for complete search history.

(56) References Cited

U.S. PATENT DOCUMENTS

| | | | | |
|---|---|---|---|---|
| 4,959,648 A * | 9/1990 | Breeden et al. | ................. | 340/7.3 |
| 5,414,457 A * | 5/1995 | Kadowaki et al. | ......... | 348/14.03 |
| 5,581,611 A * | 12/1996 | Yunoki | ..................... | 379/211.03 |
| 5,659,601 A * | 8/1997 | Cheslog | ................... | 379/121.02 |
| 5,799,073 A * | 8/1998 | Fleischer et al. | ......... | 379/112.01 |
| 6,225,976 B1 * | 5/2001 | Yates et al. | ..................... | 345/156 |
| 6,430,405 B1 * | 8/2002 | Jambhekar et al. | ........... | 455/403 |
| 6,529,724 B1 * | 3/2003 | Khazaka et al. | .............. | 455/405 |
| 6,757,371 B2 * | 6/2004 | Kim et al. | ................ | 379/114.22 |
| 6,781,575 B1 * | 8/2004 | Hawkins et al. | .............. | 345/173 |
| 6,895,088 B1 * | 5/2005 | Nelson et al. | ................. | 379/219 |
| 6,917,610 B1 * | 7/2005 | Kung et al. | .................... | 370/352 |
| 7,092,509 B1 * | 8/2006 | Mears et al. | ............ | 379/266.01 |
| 7,212,840 B2 * | 5/2007 | Nakamura | .................... | 455/567 |
| 2003/0112937 A1 * | 6/2003 | Kreckel et al. | ................ | 379/126 |
| 2005/0130614 A1 * | 6/2005 | Suzuki | ....................... | 455/186.2 |
| 2005/0265578 A1 * | 12/2005 | Kim | ............................. | 382/102 |
| 2006/0064298 A1 * | 3/2006 | Lee | ................................ | 704/200 |
| 2006/0242007 A1 * | 10/2006 | Leong et al. | .................... | 705/14 |
| 2007/0174432 A1 | 7/2007 | Rhee et al. | | |

FOREIGN PATENT DOCUMENTS

| | | |
|---|---|---|
| KR | 100620004 | 8/2006 |
| KR | 1020070087892 | 8/2007 |

* cited by examiner

Primary Examiner — Kent Chang
Assistant Examiner — Ronald Eisner
(74) Attorney, Agent, or Firm — The Farrell Law Firm, P.C.

(57) ABSTRACT

A mobile communication terminal for displaying supplementary information on a background screen includes a communication unit, a storage unit for storing cumulative transmissions and receptions of calls and messages corresponding to supplementary information, a cumulative number rank determiner for comparing the cumulative transmissions and receptions of calls and messages and determining a cumulative number rank for the phone number, a controller for creating a map consisting of the supplementary information arranged from the highest to the lowest cumulative number rank of the phone number, and a display unit for displaying the supplementary information together with the cumulative number rank. The terminal allows a user to easily visualize supplementary information corresponding to a phone number by display on the background screen.

14 Claims, 3 Drawing Sheets

FIG. 2

| PHONE NUMBER (21) | USER NAME (23) | CUMULATIVE NUMBER OF TRANSMISSIONS / RECEPTIONS (25) | IMAGE (27) |
|---|---|---|---|
| 011-111-1111 | JOHN DOE I | 15 | CAT 1 . JPG |
| 011-123-4567 | JOHN DOE II | 12 | CAT 2 . JPG |
| 02-123-4567 | COMPANY XYZ | 10 | SHEEP . JPG |
| 031-789-6543 |  | 03 | DEFAULT . JPG |
| ⋮ | ⋮ | ⋮ | ⋮ |

START

S210 — STORE CUMULATIVE NUMBERS OF TRANSMISSIONS / RECEPTIONS OF CALLS AND MESSAGES CORRESPONDING TO SUPPLEMENTARY INFORMATION CORRESPONDING TO PHONE NUMBER

S230 — DETERMINE CUMULATIVE NUMBER RANK ACCORDING TO CUMULATIVE NUMBER

S250 — DISPLAY SUPPLEMENTARY INFORMATION CORRESPONDING TO DETERMINED CUMULATIVE NUMBER RANK IN THE FORMAT OF NUMERIC KEYPAD

S270 — TRANSMIT CALL/MESSAGE TO PHONE NUMBER CORRESPONDING TO SUPPLEMENTARY INFORMATION SELECTED AMONG DISPLAYED SUPPLEMENTARY INFORMATION

END

MOBILE COMMUNICATION TERMINAL DISPLAYING BACKGROUND SCREEN AND DISPLAY METHOD THEREOF

PRIORITY

This U.S. application claims priority under 35 U.S.C. §119 to Korean Patent Application No. 2006-0046833 entitled "Mobile Communication Terminal Displaying Background Screen And Display Method Thereof", which was filed in the Korean Intellectual Property Office on May 25, 2006, the contents of which are incorporated herein by reference.

BACKGROUND OF THE INVENTION

1. Field of the Invention

The present invention relates generally to a mobile communication terminal displaying a background screen and a display method thereof, and in particular, to a mobile communication terminal for displaying phone number-related information according to cumulative transmissions and receptions of messages and phone calls, and a method thereof.

2. Description of the Related Art

Typically, an abbreviated dialing function allows a user of a mobile communication terminal or telephone to dial another party using a few digits. To perform this function, the user can register or modify an abbreviated number using digits or can use a part of another party's phone number as the abbreviated number.

The user of a mobile communication terminal must remember individual abbreviated numbers for dialing in order to use the preset abbreviated dialing numbers. To solve this inconvenience, abbreviated dial information may be displayed on an initial screen of the mobile communication terminal. However, this arrangement is inconvenient in that it provides information about abbreviated dial numbers without indicating the user.

SUMMARY OF THE INVENTION

In order to solve the above problems, an object of the present invention is to provide a mobile communication terminal for displaying supplementary information corresponding to a phone number on a background screen of the mobile communication terminal and a display method thereof.

Another object of the present invention is to provide a method and mobile communication terminal for displaying supplementary information corresponding to a phone number according to cumulative transmissions and receptions of calls and messages corresponding to the phone number.

In order to achieve the above objects, according to the present invention, there is provided a mobile communication terminal for displaying a background screen, including a communication unit for transmitting and receiving calls and messages on the mobile communication terminal a storage unit for storing cumulative transmissions and receptions of the calls and messages, and supplementary information, corresponding to each phone number, a cumulative number rank determiner for comparing the cumulative transmissions and receptions of calls and messages corresponding to each phone number and determining a cumulative phone number rank, a controller for creating a map consisting of supplementary information arranged from the highest to the lowest cumulative phone number rank, and a display unit for displaying the map consisting of the supplementary information and the cumulative number rank.

According to the present invention, there is provided a method for displaying a background screen of a mobile communication terminal, including storing cumulative transmissions and receptions of calls and messages on the mobile communication terminal corresponding to supplementary information corresponding to each phone number, comparing the cumulative transmissions and receptions of calls and messages contained in the supplementary information corresponding to each phone number and determining a cumulative phone number rank for the phone number, and creating a map consisting of the supplementary information arranged from the highest to the lowest cumulative phone number rank and displaying the map.

The present invention allows a user to visualize supplementary information corresponding to a phone number more easily by displaying the supplementary information on a background screen of a mobile communication terminal in order of the rank of the cumulative transmissions and receptions of calls and messages corresponding to each phone number.

The present invention also enables simple transmission of calls and messages to a phone number corresponding to specific supplementary information selected among supplementary information displayed for each phone number on the background screen.

BRIEF DESCRIPTION OF THE DRAWINGS

The above and other objects, features and advantages of the present invention will become more apparent from the following detailed description in conjunction with the accompanying drawings, in which:

FIG. 2 illustrates a database structure for managing supplementary information in the mobile communication terminal of FIG. 1;

FIG. 3 is a flowchart illustrating a method for displaying a background screen of a mobile communication terminal according to the present invention.

DETAILED DESCRIPTION OF PREFERRED EMBODIMENTS

Hereinafter, preferred embodiments of the present invention will be described in detail with reference to the accompanying drawings. The same reference numbers will be used for the same or like components in the accompanying drawings. Detailed explanations for well-known functions and configurations incorporated herein will be omitted for the sake of clarity and conciseness.

A method for displaying a background screen of a mobile communication terminal according to the present invention includes displaying supplementary information corresponding to phone numbers using a map below an uppermost status icon indicating the status of the mobile communication terminal.

The method for displaying the background screen of the mobile communication terminal may further include setting a setting option in a main menu to allow a user to select whether to display the map on the background screen.

In addition, the method may include setting up a screen transition function button for switching between a background screen and a map screen of the mobile communication terminal by pressing the screen transition function button. The background screen according to the present invention refers to a screen being displayed when the mobile communication terminal is in a 'no operation' or standby state.

Figure 1:
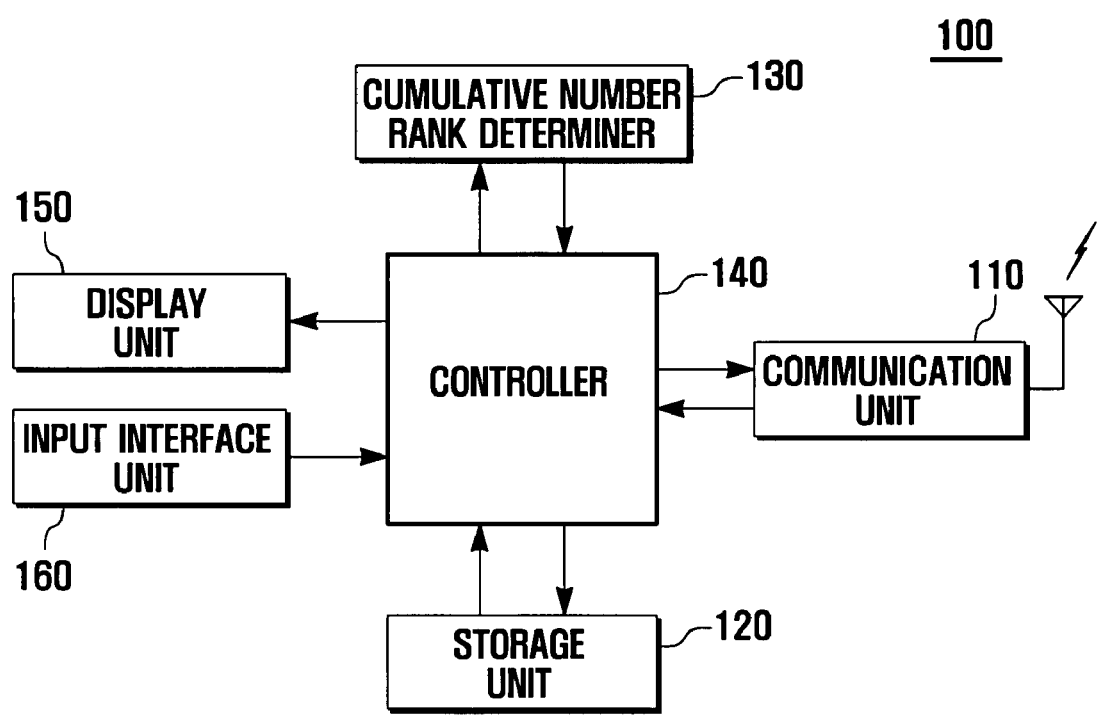
FIG. 1 is a block diagram of a mobile communication terminal according to the present invention.

FIG. 1 is a block diagram of a mobile communication terminal 100 according to the present invention. Referring to FIG. 1, the mobile communication terminal 100 includes a communication unit 110, a storage unit 120, a cumulative number rank determiner 130, a controller 140, a display unit 150 and an input interface unit 160. The communication unit 110 transmits and receives data such as calls and messages for wireless communication in the mobile communication terminal 100.

The communication unit 110 may transmit at least one of a phone call and a message to a phone number by selecting supplementary information corresponding to the phone number from a map of the supplementary information by a user. In this case, the map consists of one or more display images, each of which displays a cumulative number rank and supplementary information corresponding to the cumulative number rank.

After selection of a specific display image according to a user input, the communication unit 110 performs dialing when a call key input is confirmed. The supplementary information may contain a phone number and a cumulative number of transmissions and receptions of calls and messages corresponding to the phone number. The supplementary information may additionally contain a user's name corresponding to the phone number when the phone number has been registered in a telephone directory, and an image stored for the user's name. When no image is stored for the user's name, a default image may be used.

The storage unit 120 stores a program for operating the mobile communication terminal 100. In addition, the storage unit 120 may store the real-time cumulative transmissions and receptions of calls and messages performed by the communication unit 110. The real-time cumulative transmissions and receptions of calls and messages are contained in the supplementary information for a phone number. Preferably, the storage unit 120 stores the real-time cumulative transmissions and receptions of calls and messages corresponding to the supplementary information for the phone number for a duration. Preferably, the duration is between one week and one month. However, other durations may be set based on user selection.

The cumulative number rank determiner 130 compares cumulative transmissions and receptions of calls and messages contained in the supplementary information corresponding to each phone number, and determines a cumulative number rank for the phone number. In particular, the cumulative number rank determiner 130 may re-determine a cumulative number rank for the phone number based on the cumulative transmissions and receptions of calls and messages accumulated in real time and stored in the storage unit 120.

The controller 140 controls the operation of the mobile communication terminal 100. In particular, the controller 140 may create a map consisting of supplementary information arranged in order of the cumulative number rank for the phone number (highest to lowest) determined by the cumulative number rank determiner 130. The controller 140 may also reorder the map in real time according to the cumulative number rank re-determined in real time by the cumulative number rank determiner 130. The controller 140 may create a map consisting of a number of display images indicating supplementary information arranged in order of the cumulative number rank (highest to lowest). Preferably, the number is 4, 9, 16 or 25. However, the number may be modified based on the user selection. Preferably, the controller 140 may create a map according to a preset map pattern and a preset shape of display images displaying supplementary information. The shape of the map and display images may be changed according to user selection. For example, the controller 140 may set the shapes of the map and the display image to 'numeric keypad' and 'quadrangle', respectively.

The display unit 150 indicates the operation status of the mobile communication terminal 100. The display unit 150 may display the map created by the controller 140, and may also update the map reordered by the controller 140 in real time. In particular, the display unit 150 may display the map according to the shapes of the map and display image indicating supplementary information, which are preset by the controller 140. Information about the cumulative number rank for the corresponding phone number may also be displayed on the display image. For example, when the controller 140 sets the shapes of the map and the display image to 'numeric keypad' and 'quadrangle', respectively, the display unit 150 may display the numeric keypad map and the quadrangular display images.

A specific screen position is selected as a default screen position on a map consisting of at least one display image displaying a cumulative number rank and supplementary information corresponding to the cumulative number rank. The default screen position is preferably located in the center of the map or at a position where the smallest number of user's key inputs occurs when a screen position is randomly selected from display images in the map displayed on a background screen. Thus, for example, the display image that corresponds to the highest cumulative number rank may be located at the default screen position. The display unit 150 may also display key images for selecting transmission of a call or a message on the background screen, and may display a Menu key image on the background screen, to indicate menu items related to transmission of a call and message when the Menu key image is selected by the user.

The input interface unit 160 receives user selection information, and may comprise one of a keypad and a touchpad. The keypad may contain directional arrow keys and side keys. The input interface unit 160 may receive user input for selecting a key image on the display unit 150, which indicates selection of transmission of a call and a message displayed on the display unit 150. The input interface unit 160 may also allow a user to select a specific display image on a map consisting of one or more display images displayed on the background screen based on input through Up/Down/Left/Right arrow keys and side keys.

FIG. 2 illustrates a database structure for managing supplementary information in the mobile communication terminal 100 of FIG. 1. Referring to FIG. 2, a supplementary information management database 20 contains a phone number field 21, a user name field 23, a cumulative number field 25 and an image-setting field 27. The phone number field 21 contains a phone number to which a call or a message has been transmitted, or from which a call or message has been received. The user name field 23 contains a user name corresponding to a phone number when the phone number has been registered in a telephone directory. The cumulative number field 25 contains information on the cumulative transmissions and receptions of calls and messages for a phone number. The image-setting field 27 contains information identifying an image set for a phone number. When no image is set for a phone number, the image-setting field 27 may be set to 'default.jpg'.

For example, the supplementary information management database 20 may contain a record consisting of the phone number field 21 containing '011-111-1111' registered in the telephone directory, the user name field 23 containing 'John Doe', the cumulative number field 25 containing '15', and the image setting field 27 containing 'cat1.jpg'. In another example, the supplementary information management database 20 may contain a record consisting of the phone number field 21 containing '031-789-6543' that is not registered in the telephone directory, the user name field 23 containing no user name, the cumulative number field 25 containing '3', and the image setting field 27 containing 'default.jpg'.

FIG. 3 is a flowchart illustrating a method for displaying a background screen of a mobile communication terminal according to the present invention.

Referring to FIGS. 1 and 3, in step S210, the controller 140 controls the storage unit 120 and stores real-time cumulative transmissions and receptions of calls and messages on the mobile communication terminal 100 in corresponding to supplementary information corresponding to an appropriate phone number. The storage unit 120 may store the cumulative transmissions and receptions of calls and messages for a duration in real time. That is, the cumulative number is contained in supplementary information corresponding to the appropriate phone number. The supplementary information may further include a user name when a phone number has been registered in the telephone directory, and an image stored for the user name. When no image is stored for the user name, the supplementary information may contain a default image.

In step S230, the controller 140 controls the cumulative number rank determiner 130 to determine a cumulative number rank for each phone number.

In step S250, the controller 140 creates a map consisting of supplementary information corresponding to the phone number arranged in order of the determined cumulative number rank (highest to lowest). The controller 140 may create a map according to a preset map pattern and a preset shape of display images that will display supplementary information. The shape of the map and display images may be changed according to user selection information. For example, the controller 140 may set the shapes of the map and the display image to 'numeric keypad' and 'quadrangle', respectively, according to the user selection information.

The display unit 150 is controlled by the controller 140 to display a map consisting of one or more display images on the background screen, wherein each display image indicates a cumulative number rank, and supplementary information corresponding thereto. The display unit 150 may also display key images for selection of transmission of call/message on the background screen. Further, the controller 140 may control the cumulative number rank determiner 130 to reorder a map according to a cumulative number rank in real time.

In step S270, the controller 140 transmits a call/message when a call/message transmission signal is input after selection of a display image, to a phone number corresponding to a display image selected by a user from one or more display images displayed on the background screen. The user selection information may be input through Up/Down/Left/Right arrow keys and side keys.

After selecting a specific display image according to the user selection information among the one or more display images, the controller 140 controls the communication unit 110 to perform dialing when a call key input is confirmed.

Figure 4:
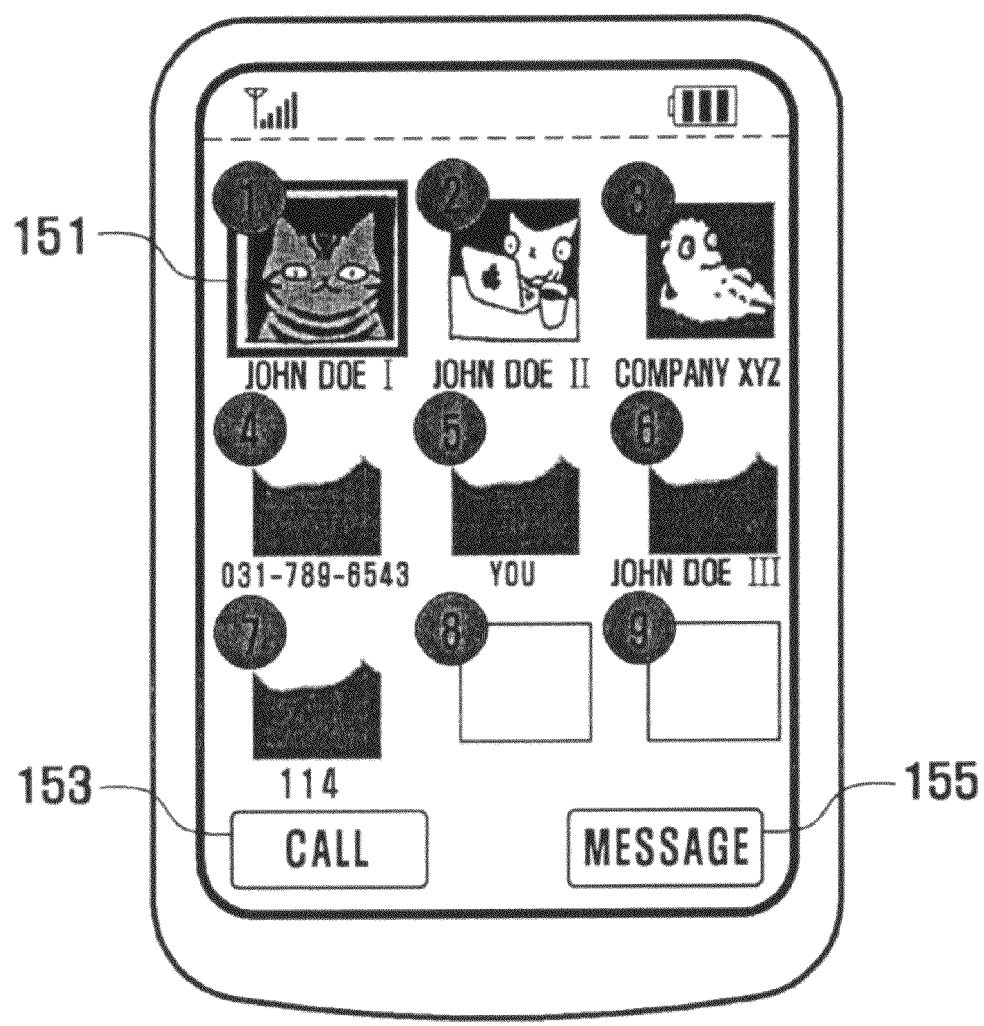
FIG. 4 illustrates a screen on which a background screen of the mobile communication terminal has been displayed according to the present invention.

FIG. 4 illustrates a screen on which a background screen of the mobile communication terminal has been displayed according to the present invention.

Referring to FIGS. 1 and 4, the controller 140 controls the cumulative number rank determiner 130 to determine a cumulative number rank according to supplementary information corresponding to each phone number stored in the storage unit 120. That is, the cumulative number rank determiner 130 determines the cumulative number rank of phone numbers corresponding to 'John Doe I', 'John Doe II', 'Company XYZ', '031-789-6543', 'You', 'Store', and '114' as first through seventh places. The display unit 150 displays nine 'rectangular display images' representing a cumulative number rank and supplementary information corresponding to the cumulative number rank on a background screen in the form of a 'numeric keypad'.

For 'John Doe I', 'John Doe II', and 'Company XYZ' ranked first through third places, respectively, a user name registered in the telephone directory and an image corresponding to the user name are displayed on the screen. In the case of 'You' and 'Store' ranked fifth and sixth places respectively, only a user name registered in the telephone directory is displayed on the screen. Additionally, in the case of '031-789-6543' and '114' ranked fourth and seventh places respectively, a user name is not registered in the telephone directory and is not displayed on the screen. When an image is not registered for a phone number, a default image may be used. The default image is set to a cloud image, and key images are also displayed on the screen. Upon recognizing an input through a key image for selecting one of a call key image 153 and a message key image 155 to connect to a phone number corresponding to the highest rank of 'John Doe I', the controller 140 performs a function corresponding to the input.

The present invention allows a user to easily visualize supplementary information corresponding to a phone number by displaying the supplementary information on a background screen of a mobile termination terminal in order of the cumulative transmissions and receptions of calls and messages.

The present invention also enables simple transmission of calls and messages to a phone number corresponding to specific supplementary information selected among supplementary information displayed for each phone number on the background screen.

While the present invention has been particularly shown and described with reference to preferred embodiments thereof, these embodiments are provided not to limit the scope of the invention, but to serve only for illustrative purposes. It will be understood by those of ordinary skill in the art that various changes in form and details may be made therein without departing from the spirit and scope of the present invention as defined by the following claims.

What is claimed is:

1. A mobile communication terminal for displaying a background screen, comprising:
 a communication unit for transmitting and receiving calls and messages on the mobile communication terminal;
 a storage unit for storing cumulative transmissions and receptions of the calls and messages, and supplementary information, corresponding to each phone number;
 a cumulative number rank determiner for comparing the cumulative transmissions and receptions of calls and messages corresponding to each phone number and determining a cumulative number rank for the phone number;
 a controller for creating a map consisting of supplementary information arranged from the highest to the lowest cumulative number rank of the phone number on the background screen, and for reordering the map on the background screen in real time according to the cumulative number rank; and a display unit for displaying the map consisting of the supplementary information together with the cumulative number rank on the background screen,
wherein the background screen is displayed when the mobile communication terminal is in a standby state,
wherein the controller sets a shape of the map to a numeric keypad and reorders key images included in the map in real time according to the cumulative number rank.

2. The mobile communication terminal of claim 1, wherein the supplementary information contains a phone number and a cumulative number of transmissions and receptions of calls and messages corresponding to the phone number.

3. The mobile communication terminal of claim 2, wherein the supplementary information further contains a user name corresponding to the phone number and an image stored for the user name.

4. The mobile communication terminal of claim 2, wherein the storage unit stores the real-time cumulative number of transmissions and receptions of calls and messages corresponding to the supplementary information corresponding to the phone number for a predetermined duration.

5. The mobile communication terminal of claim 4, wherein the display unit displays key images for selecting transmission of a call or a message on a screen.

6. The mobile communication terminal of claim 5, further comprising an input interface unit for inputting user selection information corresponding to the displayed key image.

7. The mobile communication terminal of claim 6, wherein the communication unit transmits at least one of a call and a message corresponding to an input of the key image according to user input through an input interface unit, to a phone number corresponding to supplementary information selected among the supplementary information displayed together with the cumulative number rank.

8. A method for displaying a background screen of a mobile communication terminal, the method comprising:
storing the cumulative numbers of transmissions and receptions of calls and messages on the mobile communication terminal corresponding to supplementary information corresponding to each phone number;
comparing the cumulative numbers of transmissions and receptions of calls and messages contained in the supplementary information corresponding to each phone number and determining a cumulative number rank for the phone number;
creating a map consisting of supplementary information arranged from the highest to the lowest cumulative number rank of the phone number and displaying the map on the background screen; and
reordering the map on the background screen in real time according to the cumulative number rank and displaying the reordered map,
wherein the background screen is displayed when the mobile communication terminal is in a standby state,
wherein the controller sets a shape of the map to a numeric keypad and reorders key images included in the map in real time according to the cumulative number rank.

9. The method of claim 8, wherein the supplementary information contains a phone number and a cumulative number of transmissions and receptions of calls and messages corresponding to the phone number.

10. The method of claim 9, wherein the supplementary information further contains a user name corresponding to the phone number and an image stored for the user name.

11. The method of claim 8, wherein in the storing the cumulative numbers step, the cumulative numbers of transmissions and receptions of calls and messages are stored in real time corresponding to the supplementary information corresponding to the phone number for a predetermined duration.

12. The method of claim 11, wherein in the displaying the map step, the map is reordered in real time according to the determined cumulative number rank.

13. The method of claim 11, wherein in the displaying of the map, key images for selecting transmission of a call or a message are displayed on a screen.

14. The method of claim 13, further comprising transmitting at least one of a call and a message corresponding to an input of the key image according to user input through an input interface unit, to a phone number corresponding to supplementary information selected among the supplementary information displayed together with the cumulative number rank according to user selection information.

* * * * *